United States Patent
Arseneau (10) Patent No.: US 9,140,806 B2
(45) Date of Patent: Sep. 22, 2015

(54) MULTIPLE TIMING MEASUREMENTS FOR POSITRON EMISSION TOMOGRAPHY

(71) Applicant: Roger E. Arseneau, Buffalo Grove, IL (US)

(72) Inventor: Roger E. Arseneau, Buffalo Grove, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 390 days.

(21) Appl. No.: 13/741,830

(22) Filed: Jan. 15, 2013

(65) Prior Publication Data
US 2014/0197320 A1 Jul. 17, 2014

(51) Int. Cl.
*G01T 1/20* (2006.01)
*G01T 1/17* (2006.01)
*G01T 1/29* (2006.01)
*G04F 10/00* (2006.01)

(52) U.S. Cl.
CPC .............. *G01T 1/171* (2013.01); *G01T 1/2985* (2013.01); *G04F 10/005* (2013.01)

(58) Field of Classification Search
CPC .............................. G01T 1/172; G01T 1/2985
USPC ........................................................ 250/362
See application file for complete search history.

(56) References Cited

U.S. PATENT DOCUMENTS

| | | | | |
|---|---|---|---|---|
| 5,475,210 | A * | 12/1995 | Taguchi et al. | 250/205 |
| 2006/0250291 | A1* | 11/2006 | Lyden et al. | 341/155 |
| 2009/0008563 | A1* | 1/2009 | Musrock et al. | 250/363.04 |
| 2010/0076300 | A1 | 3/2010 | Arseneau et al. | |
| 2012/0022364 | A1 | 1/2012 | Caruba et al. | |
| 2012/0101779 | A1 | 4/2012 | Arseneau | |
| 2012/0153165 | A1* | 6/2012 | Ott | 250/362 |
| 2013/0341518 | A1* | 12/2013 | Fries et al. | 250/363.03 |
| 2014/0328466 | A1* | 11/2014 | Proksa et al. | 378/62 |

* cited by examiner

*Primary Examiner* — David Porta
*Assistant Examiner* — Abra Fein
(74) *Attorney, Agent, or Firm* — Peter Kendall (57) ABSTRACT

Timing is determined in positron emission tomography (PET). Two or more different types of timing detection are used for each event. The difference in time from the different types of timing detection may indicate whether or not an error has occurred. An average difference or other typical offset difference may be used to correct the error. During pile up, the difference information may be used to create a missing time, such as using an average difference between second derivative and constant fraction discrimination as an offset to determine constant fraction timing from second derivative timing.

16 Claims, 5 Drawing Sheets

MULTIPLE TIMING MEASUREMENTS FOR POSITRON EMISSION TOMOGRAPHY

BACKGROUND

The present embodiments relate to timing measurement in positron emission tomography (PET). Blocks of detectors detect gamma rays emitted indirectly by a positron-emitting tracer. Using spatially diverse detectors, pairs of gamma rays generated by a same positron may be detected. The pairs of gamma rays travel about 180 degrees apart. To distinguish specific pairs, the coincidence of detected gamma rays is determined. The timing of receipt is used to pair the detected gamma rays, detecting events along lines of response. Time of flight may be used to detect segments of the line of response.

The timing of a detected event is determined using a timing circuit. For example, a time-to-digital converter is used to determine a time at which the event occurred. Different types of timing circuits have been proposed. Different advantages and weaknesses are provided by each. For example, constant fraction discrimination is accurate, providing sufficient accuracy for time of flight to select a segment of the line of response. However, constant fraction discrimination is susceptible to errors due to scattering and may not detect a time for subsequent events during a pile up. As another example, second derivative discrimination may detect subsequent events during a pile up, but has less timing accuracy or resolution than constant fraction discrimination.

BRIEF SUMMARY

By way of introduction, the preferred embodiments described below include methods, systems, instructions, and computer readable storage media for positron emission tomography (PET) timing determination. Two or more different types of timing detection are used for each event. The difference in time from the different types of timing detection may indicate whether or not an error has occurred. An average or other typical difference may be used to correct the error. During pile up, the difference information may be used to create a missing time, such as using an average difference between second derivative and constant fraction discrimination as an offset to determine constant fraction timing from second derivative timing.

In a first aspect, a method is provided for positron emission tomography (PET) coincidence processing. A timing circuit detects a first time of a first PET event with a first type of timing measurement. The timing circuit detects a second time of the first PET event with a second type of timing measurement. The second type is different than the first type. A difference between the first and second times is determined. The difference is compared with an offset difference. The first time, the second time, or both the first and second times are corrected when the difference is greater than the offset difference by at least a threshold amount. The corrected first time, second time, or both are used for the PET coincidence processing.

In a second aspect, a non-transitory computer readable storage medium has stored therein data representing instructions executable by a programmed processor for positron emission tomography (PET) timing determination. The storage medium includes instructions for determining a difference in time between detection of a non-piled event with first and second timing detectors, detecting a piled up event associated with a positron emission, determining a first time of occurrence of the piled up event with the first timing detector, and generating a second time of occurrence of the piled up event, the second time of occurrence being a function of the first time and the difference.

In a third aspect, a positron emission tomography (PET) system includes a detector operable to detect positron emission. A processor is configured to determine an error in timing of the positron emission and set the timing as a function of a relationship between two or more different ways of detecting the timing.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A plurality of types of timing algorithms are used for a same event in positron emission tomography (PET). For a given event at a detector, the different types of timing algorithms may provide different times. The difference in the times is used to correct one or more of the times and/or to create a time.

To correct, the difference is compared to an offset or typical difference (e.g., an average difference). If sufficiently greater or lower, one or more of the times are adjusted by an empirical amount or an amount that adapts to the difference. For example, constant fraction discrimination (CFD) may be susceptible to errors. A greater difference from second derivative discrimination may indicate an error in the CFD. The time from the CFD is adjusted to provide a lesser or greater difference, whichever results in the difference being closer to the average or offset.

Creation of a time may be used to deal with pile up or other failure to detect. To deal with pile up, the difference is used to determine one of the times. Due to pile up, one of the timing algorithms (e.g., CFD) may be inaccurate or even fail to detect a time of a piled-up or subsequent pulse in the pile up sequence. A replacement time for that timing algorithm is generated using the difference. For example, an average difference between times of two timing algorithms is used to create a time for one of the algorithms (e.g., CFD) from the time detected for another of the algorithms (e.g., second derivative discrimination).

Figure 1:
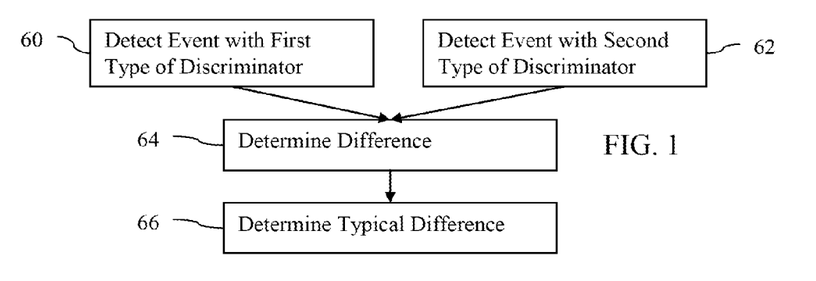
FIG. 1 is a flow chart diagram of one embodiment of a method for positron emission tomography (PET) timing determination.

FIG. 1 shows one embodiment of a method for positron emission tomography (PET) coincidence processing and/or timing determination. The time of an event is determined for use in coincidence processing. The time for an event from one detector may be matched with a time of an event for another detector to define a line of response. The time may be used in time of flight to identify a segment along the line of response. For the time of flight or coincidence processing, the time of each event at the detectors is determined with nano or pico second accuracy.

Figure 3:
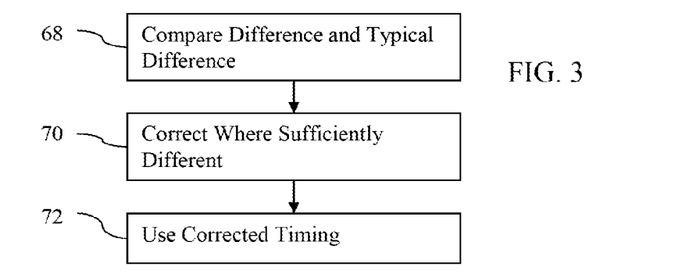
FIG. 3 is a flow chart diagram of one embodiment of a method for PET timing determination with time correction.
Figure 5:
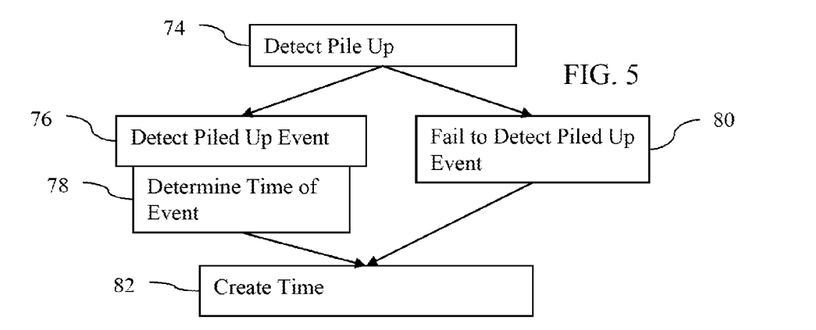
FIG. 5 is a flow chart diagram of one embodiment of a method for PET timing determination with creation of a replacement time.

FIG. 1 is directed to use of multiple timing determinations for a given event and calculation of difference information for the times from the multiple timing determinations. FIGS. 3 and 5 show use of the difference information, either the difference in time detected for a given event or a typical (e.g., average difference) from multiple events. FIG. 3 is directed to correction of timing. FIG. 5 is directed to creating timing for an event where timing detection failed or is unreliable.

Figure 7:
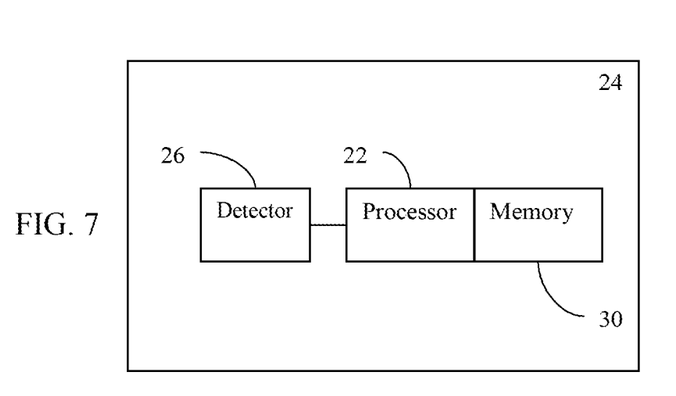
FIG. 7 is a block diagram of one embodiment of a system for PET timing determination.

The methods of FIGS. 1, 3, and 5 are implemented using the system of FIG. 7, a processor, a computer, or other device. The methods are performed in the order shown, but other orders may be used. For example, acts 60 and 62 or acts 76 and 80 are performed in any order or simultaneously. Additional, different, or fewer acts may be provided. For example, the created time of act 82 is used in coincidence processing. As another example, the detection of pile up in act 74 is combined with acts 76 and 80, such that the detection and failure to detect of acts 76 and 80 indicate the detection of pile up in act 74. The method of FIG. 1 may be performed without the methods of FIGS. 3 and/or 5. Similarly, the methods of FIG. 3 or 5 may be performed without the method of FIG. 5 or 3, respectively.

Figure 2:
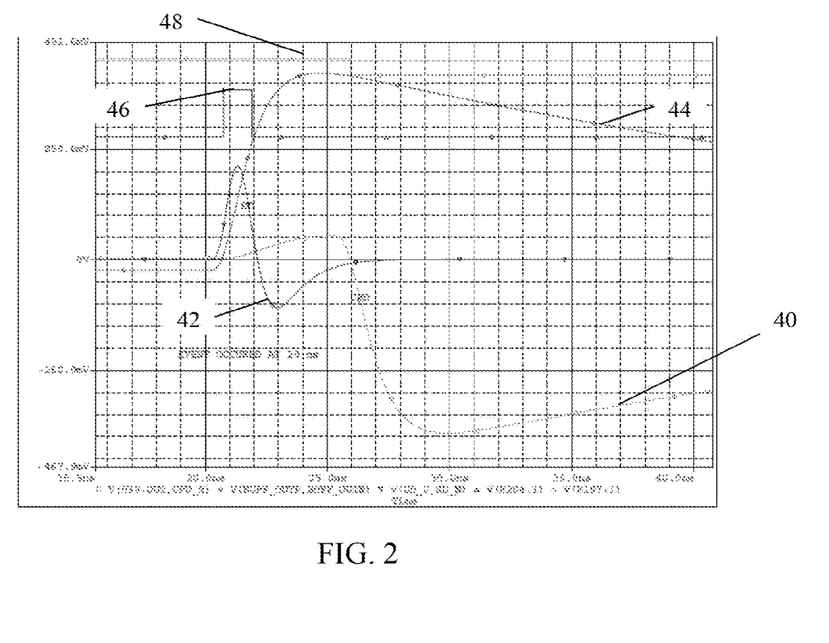
FIG. 2 is an example graph of timing for different types of detection.

Referring to FIG. 1, a PET event is detected in acts 60 and 62. In response to an emission of a pair of gamma rays (photons), arrays of crystals contacted by the gamma rays generate light. The detectors, in response to the light, generate signals. For a given emission, two signals are detected. Each signal is an event at a different detector. Acts 60 and 62 represent detection of a same event with different types of timing measurements. The signal causes the detector to generate a voltage. An example voltage amplitude due to an event is shown in FIG. 2 at 44. The light generated from the crystal is detected and a time at which the event occurred is determined. The detected signal is an analog signal or a digitally sampled signal. The acts 60 and 62 are repeated for other events detected at the same and/or different detectors.

A timing circuit implements the detection of the time of occurrence of the event. The timing circuit is a processor, digital circuit, analog circuit, time-to-digital converter, clock, counter, interpolator, amplifier, comparator, combinations thereof, or other device for determining a time of occurrence for a signal 44. Any type of timing circuit may be used, such as a digital or analog timing circuit. The same or different circuit components may be used to implement the different types of timing measurements. The timing circuit may include separate portions for implementing the separate types of measurements. Some or all of the components may be shared for implementing the separate types of measurements. Other timing circuits may be used.

In one embodiment, the timing circuit is a digital device. The signal is sampled with an analog-to-digital converter. The timing is determined from the digital samples. For example, a fraction of a clock cycle of a clock operating the analog-to-digital converter (ADC) is used to find the timing. A synchronization (SYNC) signal resets a counter. The counter counts the clock cycles from the SYNC pulse. The event signal is digitized with the ADC run by the clock. When an event occurs, the counter value is determined and the fraction of the clock cycle at which the event occurs is calculated. The counter value along with the fraction of the clock cycle is the time of the event from the SYNC signal.

In another embodiment, the timing circuit is an analog device. The analog signal output from the detector or an amplifier is used without an ADC, at least for determining the timing. For example, a stop pulse is generated and provided to a time-to-digital converter (TDC). A SYNC signal triggers the start of the TDC. Amplifiers and comparators produce a stop pulse for the TDC when the event occurs. The TDC then measures the time between the SYNC and the stop for the time of the event after the SYNC signal.

The same event is detected using multiple approaches. For a given event at a detector, different time algorithms are applied to the signal. Two or more time algorithms are applied. Any now known or later developed timing algorithm may be used. For example, different types of timing algorithms include leading edge (LE), constant fraction discrimination (CFD), second derivative (SD), and back projection (BP). Other types may be used. While algorithm is used, the types of timing detectors are implemented using software (instructions) and/or hardware. For example, a field programmable gate array (FPGA) configured pursuant to instructions implements the different types based on output from the timing circuit or as part of the timing circuit. A digital timing system includes the ADC, which provides two compliment values of the event to the FPGA at a 500 MHZ rate for processing. The event signal has a rise time of 3 clock cycles or 6 ns, but other rates, rise times, and/or components may be used.

In one example embodiment, CFD and SD are applied to the same event. In the FPGA example, the CFD may be run with a delay of 6 clock cycles with the non-delayed compare signal at 6%. FIG. 2 shows the CFD signal at 40. The CFD signal includes two components, the attenuated component (e.g., attenuated to be 6% of the event amplitude) and the delay component (e.g., the event signal delayed by an amount). The delay component is subtracted from the attenuation component. In response to the event, the CFD signal ramps up with the event signal until the delay component kicks in. After the delay of 6 clock cycles, the inverse of the amplitude of the event signal is added to the attenuated component, causing the drop at about 26 ns. Other delays and/or attenuation amounts may be used. The SYNC signal resets the counter. The counter counts the number of 500 MHZ clock cycles after the SYNC signal. This is the same clock that drives the ADC. The value of the counter when the delayed event signal becomes greater then the non delayed 6% value of the event signal (e.g., the zero crossing) is determined. The value of the ADC before and after the zero crossing is used to determine the fraction of the clock cycle at which the crossing occurred. The fraction is then added to the counter value to get the time from the SYNC signal. For example, if the crossing occurs in the 8 cycle and the fraction is 2300/4096, the time from the SYNC is 2 ns*7+2 ns*2300/4096=15.123 ns. Other CFD may be used.

For SD, the value of the counter when the second derivative becomes negative is determined. For digital implementation, the second derivative is implemented by differencing sequential samples. The differences are then differenced, providing the second derivative. FIG. 2 shows the SD signal at 42. The value of the ADC before and after the zero crossing is used to determine the fraction of the clock cycle at which the crossing occurred. The fraction is added to the counter value to get the time from the SYNC signal. If the crossing occurred in the 6 cycle and the fraction was 72/4096 the time from the SYNC would be 2 ns*5+2 ns*72/4096=10.035 ns.

As shown in FIG. 2, the SD type of timing discrimination determines a time for the event earlier than the CFD type of timing discrimination. The times may be the same or the CFD time may occur earlier. Other relative times may result from use of other types of timing detectors.

In act 64 of FIG. 1, a difference between the times is determined. The difference is a difference in time between detection of the event with the different timing detectors. The difference is for the given event. FIG. 2 shows detection of a non-piled up event. In other embodiments, the times are for detection of a piled up event.

One time is subtracted from the other time. For example, the SD time is subtracted from the CFD. The CFD algorithm is likely to detect a later time than SD due to the delay component used in the CFD. In alternative embodiments, the CFD time is subtracted from the SD. Other functions than subtraction may be used. For example, a weighted subtraction is used where one time is weighted more strongly than another time. For three or more different times, separate differences between each possible combination are calculated. The separate differences are maintained separate or may be combined, such as averaging the differences.

In the example of FIG. 2, the time difference for the two timing algorithms on the same event is 15.123 ns–10.035 ns=5.088 ns. Other differences may be provided.

Other types of differences may be calculated or used. In act 66 of FIG. 1, the difference between times for a given event is used to derive another difference. The other difference is an offset difference. The offset difference represents a typical separation in time between the types of timing discriminators. The offset difference may be empirical or calibrated. The offset difference may be determined based on theory. A look-up table or offset difference from memory may be used. In one embodiment, the offset difference is specific to a PET system or specific to a detector, so adapts to the timing measurements made by the system or detector. The adaptation is through calibration or is for a given examination. For example, the offset difference is determined for a given examination, such as using an average of the most recent differences (e.g., most recent 100 or more events). A same average is used for the entire system, or separate averages are calculated for each detector or detector block.

The average is for a moving time or event window. As new differences become available, the average is recalculated with the new differences. Older differences may be excluded in the recalculation or may be included. Alternatively, the average is for an examination, for use of the PET system, or for another period. In other embodiments, a calibrated, experimental, or other offset difference is used.

The average represents the typical difference between non-piled times for the different types of measurements. Pile-up detection may be used to avoid including differences associated with a piled up event from being included. Alternatively, the differences for a piled up event are included, such as where the timing detectors consistently detect piled-up events.

FIG. 3 shows one example use of the difference information, including the offset difference from act 66 and the difference for a given event from act 64. In act 68, the difference for a given event is compared with the offset difference. Any comparison function may be used. For example, a difference between the differences is calculated.

The comparison determines whether the difference for an event is atypical or not similar to the typical difference. For example, when an event occurs, the time difference is checked against the average difference.

A tolerance is established with a threshold. For example, the difference of the differences is to be below a value. Any value may be used. The value may be set based on expected, typical, or other desired level more likely associated with an error in timing detection. If there is a difference greater then the set error value, then the error in timing detection is determined. Other functions may be used, such as comparing the average summed with the tolerance to the event difference.

In act 70, one or more times are corrected. When an error is found from the comparison, a detected time is corrected to remove or reduce the error. Which of the times to correct may be known or assumed. For example, CFD is more error prone than SC, so the CFD time is corrected. Alternatively, both times are corrected. Weighting may be applied to change one time more than another, such as changing the CFD time more than the SD time.

The correction may be to reduce the difference in times. By reducing the difference, the difference is made to be within the tolerance. The correction may increase the difference. The difference in times for an event is made to be closer to or at the offset difference (e.g., the average difference).

The correction is by adding or subtracting time. For the earlier detected time, time is added. For the later detected time, time is subtracted. The opposite change may be made to increase the difference.

Any amount of time may be added or subtracted. In one embodiment, a predetermined or empirically determined adjustment is provided. The amount of adjustment may be a function of the amount of deviation from the typical. For example, a look-up table provides different adjustments for different amounts of deviation from the offset. Greater deviations result in greater adjustment. In other embodiments, a function is applied to relate the amount of deviation to the adjustment. Any linear or non-linear function may be used. Alternatively, a fixed change regardless of the amount of deviation is used.

Figure 4:
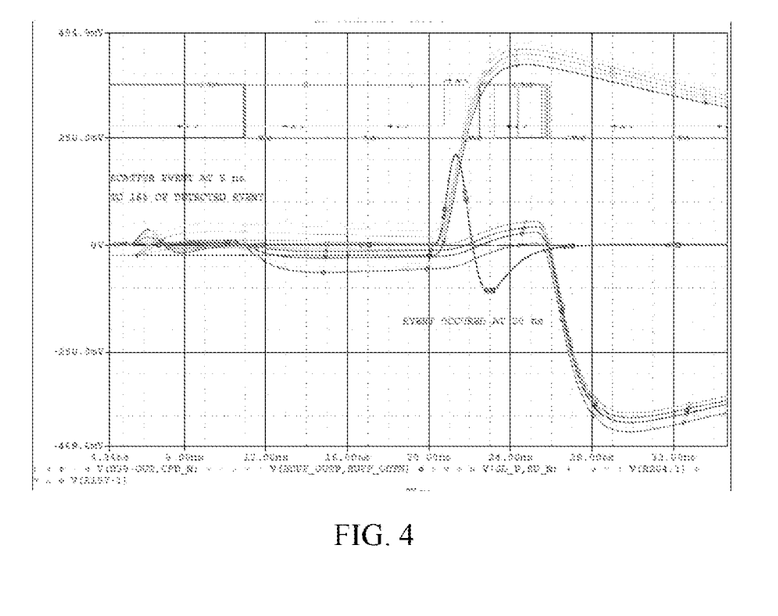
FIG. 4 is an example graph of timing for different types of detection with scatter noise.

The correction may compensate for error or irregularity even where the source of error or amount of contribution of error is not known. The timing detection may be improved by correction. For example, the CFD timing for the event includes an error due to scattering or other noise. FIG. 4 shows various possible CFD signals resulting from scattering or other noise. The noise causes a baseline shift just before the detected event. The CFD type of timing detection may provide about 50 ps better timing then the SD, but is more effected by baseline shifts such as for a small scattered event occurring just before a detected event. In FIG. 4, scatter occurs at 15 ns before the actual event. The scatter examples are 0% (no scatter) to 16% (scatter) of the event amplitude. Large baseline shift may cause larger error in CFD timing.

For a given event, only one CFD signal results, for example, the larger (e.g., 16%) scatter signal. When the time detected from the signal is sufficiently different than the normal, the timing resulting from the noise is corrected. For example, the CFD time or both the CFD and SD times are corrected to reduce the difference in differences. The amount of correction to the CFD relative to the SD may be set to achieve the smallest timing window.

In act 72, the corrected time or times are used. The time or times are reported for coincidence processing. The time information is stored or transmitted for use in coincidence processing.

In one embodiment, one of the times is selected as the time to be used for coincidence processing. Any selection criteria may be used. For example, the time with the greatest likelihood of accuracy or the time with the greatest resolution is selected. For example, CFD is selected over SD for non-pile up events. Empirical study or theory may be used to determine the time to use. The same criteria are applied to the different events for more accurate coincidence determination.

Multiple times may be reported. The different times for an event may be matched with different times for an event from another detector. Criteria based on both or multiple times for the same event may be used to define the line of response.

FIG. 5 shows use of the difference information for creating a time, such as creating a time where the timing has failed due to an event associated with pile up. The difference information is used to provide timing for a subsequent event. The difference information may be used to deal with one of the timing algorithms not detecting the subsequent event. The difference information is used to provide adequate timing for the subsequent event.

Figure 6:
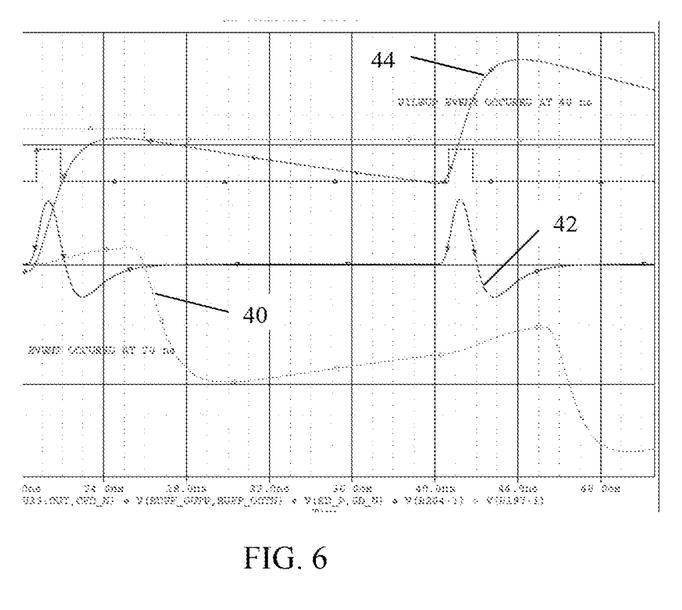
FIG. 6 is an example graph of timing for different types of detection in pile up.

FIG. 6 shows an example of pile up. Two events are provided at about 20 ns and 40 ns. More than two events or other times may be used. The subsequent event is piled up with the earlier event, so the signal 44 does not transition back to a zero or low voltage before the subsequent event occurs.

Referring to FIG. 5, the pile up is detected in act 74. Any pile-up detection may be used, such as detecting based on the change, pattern, or variation in the amplitude of the detection signal 44. The earlier event is detected as a non-pile up event, but the subsequent event is detected as a pile up event. The signal is determined as being associated with pile up. The determination is part of detecting the piled-up event or independent of the detection of the piled-up event.

In act 76, the piled-up event itself is detected. The event is detected using CFD, SD, or other detection. The earlier or first event of the pile up is detected. One timing detector may detect both the earlier or first event and subsequent events. Another timing detector may detect only the first or earlier event.

The subsequent event is detected by one or more, but less than all of the timing detectors. For example, the piled-up event at about 40 ns in FIG. 6 is detected. The piled-up event is detected using any detection method. In one embodiment, the event is detected by determining the timing of the event in act 78. For example, SD is applied to detect the time of occurrence of the piled-up event. In the example of FIG. 6, the SD discriminator detects the event time as about 42 ns. Other types timing detection may be used. Other times may be detected.

In one embodiment of detecting the pile-up in act 74, the detection of the subsequent event with one or more timing detectors in act 78 and failure to detect in act 80 indicates pile up. The combination of detection and failure to detect with specific timing detectors indicates pile up. For example and as represented in FIG. 6, SD detects and CFD does not detect the timing, indicating a pile up.

In act 80, one or more of the types of timing measurements fail to detect the piled-up event. In the example of FIG. 6, the CFD does not detect a time for the subsequent event. While CFD may provide more accurate or better timing for the initial event of the pile up as compared to SD, SD provides adequate timing for the subsequent event where CFD provides no timing. Other types of timing measurement may fail to detect an event, even if not due to pile up. As an alternative to failure to detect, the time is detected, but likely subject to error or other source making the time unreliable.

In act 82, the difference information is used to create the missing or unreliable time. The time being created is for the subsequent or piled-up event. The time is a replacement for the failure to detect or unreliable detection of the time. For example, the time being created is a replacement for the missing CFD time.

In act 78, at least one time is provided for the subsequent event. However, the time measurement for the subsequent event may be of a different type than used to detect the time of the coincident gamma event. Since relative time is used for coincidence processing, the time or times from the same type of timing measurement are used consistently for each event. For example, CFD time may be more accurate for events in general, so is used for coincidence processing. Since an SD time may be offset in time from the CFD time, the SD time is not used as the replacement.

The CFD time is created based on the SD time and the difference. Since CFD time is not detected, the difference between two times for a given event is not known. Instead, the average or other offset difference indicating a typical difference for the detector, for the block of detectors, for the PET system, across PET systems, or in theory is used. This offset difference from act 66 indicates the typical difference between the times of the different types of measurements. For example, in the piled-up event, the average time delta of the SD and CFD times is used to correct the SD timing to act like the timing is generated by the CFD with out any external calibration. The CFD replacement is the SD time corrected by the difference. For example, a typical SD/CFD difference of 3.40 ns is added to the SD time to create the CFD time replacement, providing 45.40 ns. Subtraction or other functions may be used.

In the SD and CFD example, when there is a pileup, the initial event uses the corrected timing of the CFD. The subsequent event or events uses the timing of the SD corrected for the average difference between the CFD and the SD. This method is self calibrating and does not need external calibration.

Other types of timing measurements may be used. In one embodiment, both or all of the types of timing measurements detect the initial and subsequent events in a piled-up situation. The method of FIG. 3 may be performed for the subsequent events instead of the method of FIG. 5. Similarly, a failure to detect or unreliable detection may occur even for an event without any pile-up. The method of FIG. 5 may be performed in this non-pile up situation.

FIG. 7 shows one embodiment of a positron emission tomography (PET) system 24. The PET system 24, using hardware, software, or hardware and software, determines the time of occurrence of events as part of functional imaging. The timing information is used for coincidence processing.

The PET system 24 includes a processor 22, a detector 26, and a memory 30. Additional, different, or fewer components may be provided. For example, FIG. 7 represents a portion of the PET system 24. Additional detectors 26 may connect with the processor 22. The same processor 22 determines event times for different detectors. Alternatively or additionally, different processors 22 with or without shared memory 30, determine event times for other detectors. The processor 22 is part of the detector block or is remote from the detectors. The processor 22 or another processor performs coincidence processing and/or reconstruction. In alternative embodiments, the processor 22 and memory 30 are provided as a workstation or computer without connecting with the detector 26. Detector signals are transmitted to or loaded from memory 30 for determining the timing.

The detector 26 comprises photo multiplier tube or silicon avalanche photodiode. The detector 26 detects positron emissions. The positron is emitted from a tracer or radiopharmaceutical. The positron interacts with an electron near the location of emission, generating gamma rays propagating at about 180 degrees apart. One of the gamma rays is received by or travels to the detector 26. Crystals connected with the detector 26 convert the gamma or other radiation into light. The detector 26 detects the light.

The detector 26 is separate from other detectors. The detector 26 may abut or connect with other detectors in a block or ring. Multiple blocks of detectors may form a ring or part of a ring around a patient space or bore of the PET system 24. By at least partially surrounding the bore, different events may be detected by different detectors. A given detector (e.g., detector 26) may detect a sequence of events from the same or different locations of the patient.

The processor 22 is a general processor, central processing unit, control processor, graphics processor, digital signal processor, application specific integrated circuit, field programmable gate array, amplifier, comparator, time-to-digital converter, analog-to-digital converter, digital circuit, analog circuit, timing circuit, combinations thereof, or other now known or later developed device for detecting event timing. For example, the processor 22 is part of a digital or analog arrangement for detecting timing in the PET system 24. In one embodiment, the processor 22 is part of an arithmetic and logic unit (ALU). The processor 22 is a single device or multiple devices operating in serial, parallel, or separately. The processor 22 is specifically designed or provided for timing measurement, but may be a main or general processor of a computer, such as a laptop or desktop computer, or may be a processor for handling tasks in a larger system, such as the PET system 24. The processor 22 may perform other functions than timing measurement.

The processor 22 is configurable. The processor 22 is configured by software and/or hardware. For example, switches, such as dip switches, are set. Potentiometers, resistances, capacitances, inductances, or other devices may be selectable or set. As another example, different software, firmware, and/or instructions are loaded or stored in memory 30 for configuring the processor 22.

The processor 22 is configured to determine and use difference information between times detected with different timing measurements. For a same event, multiple timing measurements are made. The timing measurements are made in different ways, with different settings, or other differences in processing. For example, different types of measurements are made. As another example, the same type of measurement is made, but with different settings (e.g., 6% and 12% attenuation and/or 6 or 3 cycle delay).

The processor 22 calculates a difference between times for a same event. Any function may be used, such as simple subtraction of the earlier time from the later time or of the time from one type from the time for another type of measurement. Other differences may be calculated. For example, an average difference is calculated. The difference for an event is averaged with differences for other events of the same and/or different detectors. A check may be performed to remove outliers from the average.

The processor 22 is configured to determine an error in timing of the positron emission. The difference for an event may be compared with the average or another offset difference. A difference between the event difference and the offset or average difference is used to indicate error. Where the comparison indicates substantial deviation (e.g., deviation from a tolerance or empirically set threshold), an error is detected. One or both of the times used for the difference may be erroneous or need correction.

Another error may be due to failure. The event difference cannot be determined where one of the timing measurements fails to determine a time.

The processor 22 is configured to set the timing. The timing is set based on the relationship between the different ways of detecting the timing. For example, one or more times are corrected. Where the relationship indicates an error, one or more times may be adjusted to provide a more typical difference. As another example, the typical difference is added to a time to create another time. The relationship between the types of measurement (e.g., the average difference) is added to a time to provide the time for another type of measurement.

The relationship may be an absolute difference. Where the relationship is based on an offset or average, an absolute difference, standard deviation, or other statistical aspect of the differences from different events may be used.

The processor 22 outputs the detected times for the events. The times are output by transmission, such as transmission to a coincidence processor. Alternatively or additionally, the times are output by storage in the memory 30 or another memory. Only one type of time is output. In other embodiments, multiple times are output for each event.

The memory 30 is a random access memory, graphics processing memory, video random access memory, system memory, cache memory, hard drive, optical media, magnetic media, flash drive, buffer, database, combinations thereof, or other now known or later developed memory device for storing data. The memory 30 stores PET input data, such as digital samples of the signal output from the detector 26 and/or timing information detected from the samples. The memory 30 stores data as processed, such as storing detected times of events or other data. The times for output may be stored or provided directly for coincidence processing without storage. Alternatively, a separate or different memory is used for PET input data and/or output times.

The memory 30 or other memory is a non-transitory computer readable storage medium storing data representing instructions executable by the programmed processor 22 for positron emission tomography (PET) timing determination. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for positron emission tomography (PET) coincidence processing, the method comprising:
 detecting, with a timing circuit, a first time of a first PET event with a first type of timing measurement;
 detecting, with the timing circuit, a second time of the first PET event with a second type of timing measurement, the second type different than the first type;
 determining a difference between the first and second times;
 comparing the difference with an offset difference;
 correcting the first time, the second time, or both the first and second times when the difference is greater than the offset difference by at least a threshold amount; and
 using the corrected first time, second time, or both for the PET coincidence processing,
 wherein detecting with the first type of timing measurement comprises detecting with constant fraction discrimination and wherein detecting with the second type of timing measurement comprises detecting with second derivative discrimination.

2. The method of claim 1 wherein detecting with the timing circuit comprise determining, with a digital timing circuit, a fraction of a clock cycle of a clock operating an analog-to-digital converter.

3. The method of claim 1 wherein detecting with the timing circuit comprises generating a stop pulse with a time-to-digital converter.

4. The method of claim 1 wherein determining the difference comprises subtracting the second time from the first time for the first PET event detected with the different first and second types of timing measurements.

5. The method of claim 1 wherein comparing comprises comparing the difference with the offset difference being an average difference between the first and second types of timing measurements.

6. The method of claim 1 wherein correcting comprises adjusting such that the difference is closer to the offset difference.

7. The method of claim 1 wherein correcting comprises correcting the first time such that the difference is closer to the offset difference.

8. The method of claim 1 further comprising reporting the corrected first time, second time or both when the first PET event is a non-pile-up event.

9. The method of claim 1 further comprising:
 detecting a third time of a pile-up event with the second type of timing measurement;
 failing to detect the pile-up event with the first type of timing measurement;
 creating a fourth time as a function of the third time and the offset difference.

10. The method of claim 9 wherein detecting the first time comprises detecting with continuous fraction discrimination, wherein failing to detect comprises failing to detect with the continuous fraction discrimination, wherein detecting the second time and the third time comprises detecting with second derivative discrimination, and wherein creating comprises determining a fourth time to replace the failure to detect with the continuous fraction discrimination.

11. In a non-transitory computer readable storage medium having stored therein data representing instructions executable by a programmed processor for positron emission tomography (PET) timing determination, the storage medium comprising instructions for:
 determining a difference in time between detection of a non-piled event with first and second timing detectors;
 detecting a piled up event associated with a positron emission;
 determining a first time of occurrence of the piled up event with the first timing detector; and
 generating a second time of occurrence of the piled up event, the second time of occurrence being a function of the first time and the difference,
 wherein determining the difference comprises determining with a continuous fraction discriminator and a second derivative discriminator.

12. The non-transitory computer readable storage medium of claim 11 wherein determining the difference comprises calculating an average difference.

13. The non-transitory computer readable storage medium of claim 11 wherein detecting the piled up event comprises detecting the piled up event as piled up by the first timing detector detecting the piled up event and the second timing detector failing to detect the piled up event.

14. The non-transitory computer readable storage medium of claim 11 wherein determining the first time of occurrence comprises determining with a second derivative discriminator.

15. The non-transitory computer readable storage medium of claim 11 further comprising adding the difference to the first time.

16. The non-transitory computer readable storage medium of claim 11 further comprising: correcting a time of occurrence of the piled up event when the difference is greater than a threshold amount.

* * * * *